United States Patent Office 2,915,800
Patented Dec. 8, 1959

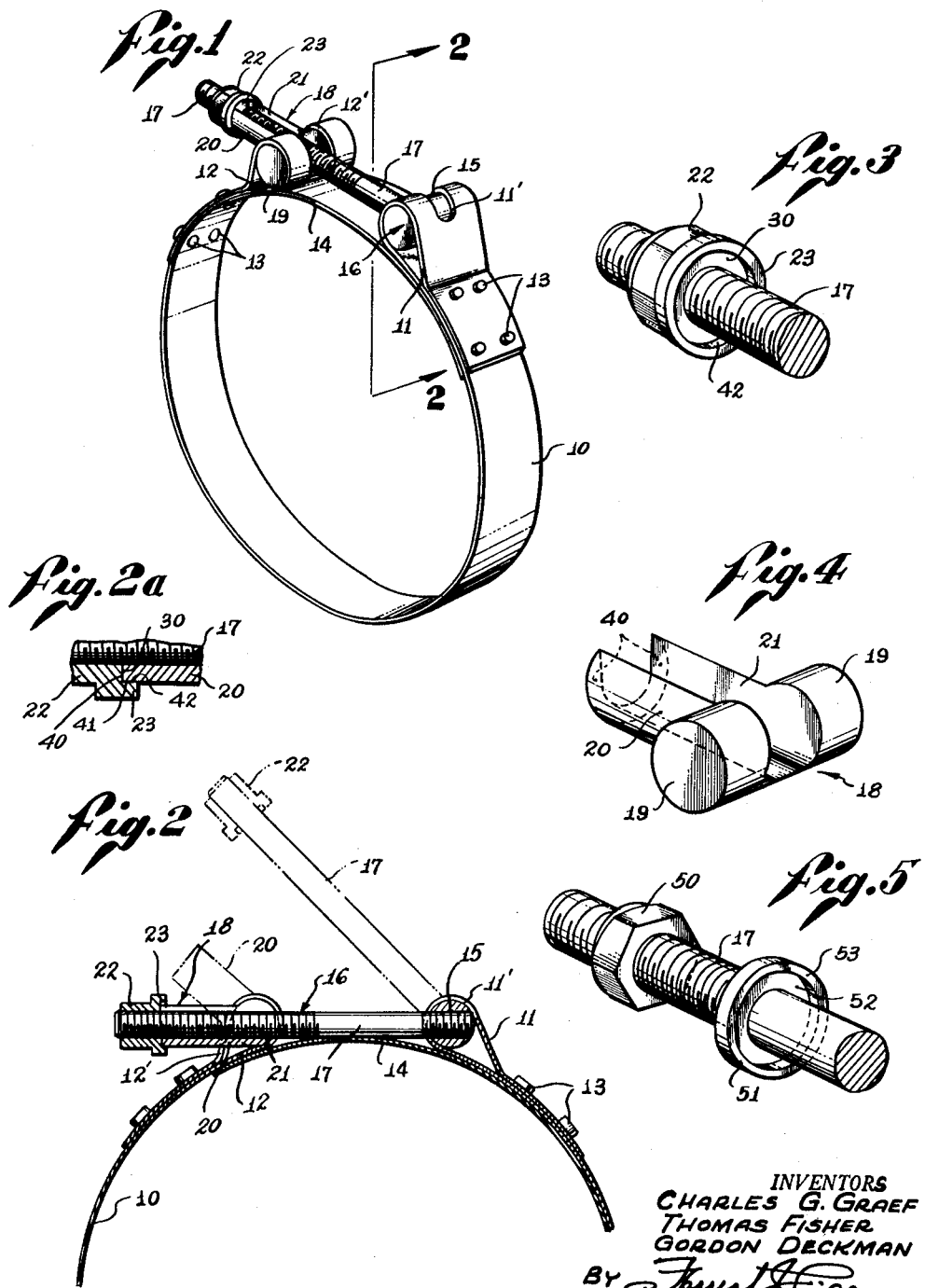

2,915,800

HOSE CLAMP

Charles G. Graef, Downey, Thomas Fisher, Torrance, and Gordon Deckman, Los Angeles, Calif., assignors to O & M Machine Company, Inc., Los Angeles, Calif., a corporation of California Application January 12, 1953, Serial No. 330,801

1 Claim. (Cl. 24—279)

This invention relates generally to hose clamps of the flexible band type, and more particularly to quick connect and disconnect devices for such hose clamps.

A primary object of the invention is the provision of a hose clamp having an improved quick connect and disconnect device.

A more particular object is to provide such a clamp that is simple and inexpensive yet fully effective and reliable.

The clamp of the invention utilizes the conventional flexible metal strap or band having slotted loops formed at its ends. The head of a simple T bolt is pivotally mounted in one of these loops, the shank of the bolt protruding through the slot in the loop. A cooperating trunnion member is pivotally mounted in the other loop, and includes a longitudinally channeled bolt guide, which extends through the slot in said loop. The shank of the T bolt is receivable into the channel of this bolt guide, the end portion projecting beyond the end of the bolt guide. A screw threaded fastening means in the form of a nut, sometimes including a washer ahead of the nut, is threaded onto the end of the bolt shank and is set against the end of the bolt guide to exert clamping pressure. To disconnect the hose clamp, this nut is backed off a few turns, and the bolt shank then swung upwardly out of its channel in the bolt guide.

The end of the bolt guide and the screw threaded fastening means are provided with co-acting interengageable positioning formations, an inwardly facing shoulder or surface on the bolt guide, and an outwardly facing shoulder or surface on the fastening means, which assure initial proper positioning of the bolt shank in the bottom of the bolt guide channel. This is of importance, since the elongated, pivotally mounted bolt guide and the pivotally mounted shank of the T-bolt comprise a toggle, which may tend to swing outwardly and release the clamp, particularly during setting up, if the bolt shank is not seated deep in the channel. Additionally, even if initially properly seated in the channel, the fastening means often tends to slide outwardly on the end of the bolt guide during final setting up, thus vitiating the intended security, and this undesired action is prevented by the described positioning shoulders. Still further, even when initially set up properly, in absence of the described positioning formations, the fastening means can slide outwardly under service conditions, paritcularly when the parts are subject to varying stresses or vibration.

A better understanding of the invention as well as its additional features and advantages will be had by referring to the following detailed description and the accompanying drawings, in which:

Figure 1 shows in perspective an illustrative embodiment of the hose clamp in a hose engaging circle in connected, locked position;

Fig. 2 is a side view partly in section as seen along the lines 2—2 of Fig. 1;

Fig. 2a is an enlarged view of a portion of the locking means;

Fig. 3 is an enlarged perspective view of the shank of the T bolt and cooperating nut;

Fig. 4 is a perspective view of the trunnion member; and,

Fig. 5 shows a modification of the locking means.

Referring to Figure 1, the hose clamp is shown as comprising a flexible strap 10 having its ends doubled back to form loops 11 and 12, the extreme ends of the strap being riveted to outer portions of the strap by rivets 13 as shown. Also included is a tongue member 14 secured to the loop 11 by the rivets 13 but in sliding engagement with the undersurface of the loop 12.

As shown in Fig. 1, the loop 11 is provided with a slot 11' cut transversely to the loop axis. Similarly loop 12 is provided with a slot 12' also cut transversely of the axis. Pivotally mounted in loop 11 is the cylindrical head 15 of a T bolt 16 whose shank 17 passes through the slot 11'. The slot 11' is of sufficient extent as to permit the T bolt 16 to swing through a substantial arc as indicated by the phantom lines in Figure 2.

Journaled in the loop 12 is an elongated bolt guide and trunnion member 18 comprising two trunnions 19 projecting oppositely from the rearward end of a longitudinally channeled bolt guide 20, shown illustratively as of generally cylindrical form the channel giving it a U-shaped cross-section. This bolt guide 20 projects through the slot 12' and is adapted to lie, when the strap 10 is in a hose engaging circle, in substantially the same direction as the shank 17 of the T bolt 16. As shown, the bolt guide 20 is formed with a longitudinal channel 21 of sufficient width and depth to accommodate the shank 17 of the T bolt.

The end portion of the shank 17 is threaded to receive a nut 22 for engaging the end of the bolt guide 20. As shown clearly in Figure 3, the nut 22 is counter-sunk to form an annular ridge 23 on its engaging face 30. This annular ridge 23 is adapted to receive and surround the end of the bolt guide 20 when the nut 22 is in engagement therewith. Thus as shown in Figure 4, the end face 40 of the bolt guide 20 comprises a seat adapted to be engaged by the engaging or clamping face 30 of the nut 22, the ridge 23 encompassing the periphery of the end of the bolt guide as shown in Figures 1 and 2. The downwardly facing peripheral area 41 on the end of the bolt guide 20 then overlies and is lockingly engaged by the upwardly facing area 42 on the inside of the lower portion of the ridge or flange 23. Fig. 2a illustrates in detail these interlocking surfaces.

In operation, the T bolt 15 is separated from the trunnion member 18, these members initially assuming the positions shown in phantom lines in Figure 2 and thereby permitting the flexible strap 10 to be radially expanded or opened. The strap 10 is placed about the hose to be clamped and the shank 17 of the T bolt then pushed down into the channel 21 of the bolt guide 20. It will be noted that the seating of the end of the bolt guide inside the annular ridge 23 positions the shank 17 properly in the channel 21. The nut 22 is then advanced on the shank 17 until the inner clamping face 30 of the nut engages the seat 40 on the end of the bolt guide 20. Nut 22 may then be tightened to draw the shank 17 through the channeled bolt guide 20 and so radially decrease the size of the strap hose engaging circle to securely clamp the hose in place. It may be noted from Fig. 2 that the longitudinal axis of the T-bolt shank 17, when the latter is properly seated in the bolt guide channel, with the positioning formations 41 and 42 in interengagement, crosses the axis of the bolt guide trunnions on the side nearest the band. Broadly, the axis of the T-bolt shank crosses the trunnion axis at least as near the band as the trunnion axis. If it were to cross outside the trunnion axis, the resulting outside "over-center" relationship would bias the T-bolt to swing outwardly toward release position. If the shank axis passes either through the trunnion axis, or inwardly thereof, there is no such release bias, as will be clear. When the nut 22 has been finally tightened, the T-bolt and bolt guide are prevented from swinging upwardly together because of the pressure of the lower or inner end portion of the seat 40 against the clamping face 30 of the nut. It will be noted that any such upward swinging of the T-bolt and bolt guide would require a further slight tightening of the band, and hence is resisted by the tension in the band. The interengaging positioning shoulders or formations 41 and 42 prevent any outward shifting of the clamping face on the nut relative to the end face 40 on the bolt guide, such as would otherwise be possible in service, particularly when the nut has been very tightly set up, or under conditions wherein the clamp is subject to vibration.

When it is desired to disconnect the clamp, the nut 22 is backed off to release the tension in the band, and to permit the interengaged shoulders or positioning elements 41 and 42 to clear one another. The shank 17 and nut 22 are then separable from the bolt guide 20.

Figure 5 shows in perspective a slight variation in the locking means for securing the shank 17 in the channel 21. Here, the countersunk lock nut of the first embodiment is in effect divided into two parts, first, a conventional hexagonal nut 50, and second, a separate countersunk washer 51, whose engaging face 52 is provided with an annular ridge 53. To set up the clamp, the nut 50 is tightened against the washer 51 to urge this latter element into engagement with the end 40 of the trunnion member 20, the ridge 53 engaging under the end of member 20 to lock the shank 17 within the channel 21 of the trunnion member in the same manner as in the first-described embodiment.

It will be seen at once that the present invention provides a hose clamp including improved tightening and locking means which may be readily connected or disconnected and which is inexpensive and reliable in operation.

Modifications within the spirit of the present invention will occur to those skilled in the art. The clamp is therefore not to be thought of as limited to the exact embodiments disclosed.

We claim:

In a hose clamp, a flexible hose-encircling strap; a T bolt having a head pivotally mounted on said strap adjacent one end thereof, and a threaded shank; an elongated bolt guide and trunnion member comprising a pair of trunnions projecting oppositely from opposite sides of one end of an elongated substantially U-shaped bolt guide, said trunnions pivotally mounted on said strap adjacent the other end thereof, said elongated U-shaped bolt guide defining a deep open channel between said trunnions and extending from end-to-end of the guide, said channel being adapted to receive the T bolt shank when the strap is bent into a hose-encircling circle; clamp tightening means including a threaded element adjustably positioned on the threaded end portion of said T bolt shank and having a clamping face at right angles to the T bolt shank for engaging the free end of the trunnioned U-shaped bolt guide, said free end of said U-shaped guide comprising a seat for said tightening means formed at right angles to the bolt guide channel, and an annular positioning flange on said tightening means around said clamping face and projecting therefrom axially of said T bolt shank, said annular flange being engageable over the free end portion of said U-shaped bolt guide when said T bolt shank is positioned in said bolt guide channel.

References Cited in the file of this patent
UNITED STATES PATENTS

| Number | Name | Date |
|---|---|---|
| 649,916 | Dietrich | May 22, 1900 |
| 911,840 | Reid | Feb. 9, 1909 |
| 991,769 | Catelain | May 9, 1911 |
| 2,270,375 | King | Jan. 20, 1942 |

FOREIGN PATENTS

| Number | Country | Date |
|---|---|---|
| 456,911 | Great Britain | Nov. 18, 1936 |